May 31, 1966 R. VOLLMER 3,253,504

PROJECTION LAMP

Filed May 21, 1963

WITNESSES
Theodore F. Knobel
James F. Young

INVENTOR
Reinhard Vollmer
BY
D. S. Buleza
AGENT

United States Patent Office 3,253,504
Patented May 31, 1966

3,253,504
PROJECTION LAMP
Reinhard Vollmer, Berlin-Schoneberg, Germany, assignor to Patent-Treuhand-Gesellschaft fur Elektrische Gluhlampen m.b.H., Munich, Germany
Filed May 21, 1963, Ser. No. 281,925
Claims priority, application Germany, May 24, 1962, P 29,477
13 Claims. (Cl. 88—24)

This invention relates to electric lamps and has particular reference to an incandescent electric projection lamp that has internally mounted reflector means and is adapted for use with a projection system having a narrow film gate aperture.

As is well-known, one of the basic requirements of an efficient projection system is that the light produced by the projection lamp be concentrated at the film gate aperture of the projector with as little loss as possible. Ideally, this should be accomplished without the use of an external reflector or condensing lens in order to reduce both the cost and size of the projector. Various types of projection lamps having integral or built-in reflectors designed to achieve this objective are known. For example, lamps of this type have been made by utilizing specially shaped envelopes having a back wall portion formed into an ellipsoidal reflector and a front wall portion formed into a spherical reflector that is provided with a transparent window or aperture through which the light passes from the lamp into the projection system. While lamps of this construction concentrated the light at the film gate aperture of the projector without any external reflectors, lenses, etc., they were not entirely satisfactory insofar as bulbs having the aforementioned compound curvature as very difficult to make and, hence, much more expensive than the straight tubular bulbs generally used.

It is also known in the prior art to arrange a reflector inside the bulb near the filament which reflector is symmetrical about its axis of revolution. Such reflectors may be of ellipsoidal configuration and designed in such a manner that they reflect visible radiation and transmit infrared radiation. This type of reflector enables only the visible radiations to be concentrated at the film gate aperture thereby avoiding excessive heating of the film. However, since only a single reflector is used, a portion of the light generated by the filament is not collected by the reflector and is lost. Thus, in order to concentrate the same effective amount of light at the film gate aperture a higher wattage lamp of this type is required compared to the aforementioned lamps having a combination of front and back reflecting surfaces obtained by properly shaping the lamp bulb. Other known lamps of this type require an internal structure that is complicated to assemble and so fragile that it is very easily damaged during shipment or during subsequent insertion of the lamp into the projector socket.

In view of the foregoing it is the general object of the present invention to provide an improved incandescent electric projection lamp having an integral reflector system that avoids the foregoing problems and other disadvantages of the prior art structure.

Another object is the provision of an electric projection lamp that can be easily assembled, will not be damaged under normal shipping and handling conditions, and that does not require a specially shaped envelope.

Still another object is the provision of an incandescent electric projection lamp having internally mounted reflector means that will uniformly and intensely illuminate the film gate aperture of a projection system without excessive heating.

A further object is the provision of a projection lamp that is capable of efficiently concentrating the light generated by the filament into a beam that meets the dimensional requirements of projectors having narrow film gate apertures.

The foregoing objects, and other advantages that will become apparent to those skilled in the art, are achieved in accordance with the present invention by mounting a main reflector of ellipsoidal configuration within the lamp envelope behind the filament, and by placing an auxiliary reflector in front of the filament in a position such that it intercepts radiation that would otherwise pass directly from the filament into the film gate aperture. The ellipsoidal main reflector comprises a portion of an ellipsoid that is substantially symmetrical about the major axis of the ellipsoid and is so positioned within the lamp envelope that the first focal point lies on the filament and the second focal point lies outside of the lamp at or proximate to the film aperture of the projector system. The auxiliary reflector is preferably of spherical configuration and may be only slightly larger than the compact filament and positioned in close proximity thereto, or it may be much larger and spaced a considerable distance from the filament.

In order to avoid the excessive build-up of heat at the film gate aperture the main ellipsoidal reflector is preferably constructed so that it reflects only visible radiation and transmits infrared radiation, whereas the spherical auxiliary reflector is constructed to have the reverse effect, that is, to reflect infrared radiations back toward the filament and transmit visible radiations. The cooperation between the main and auxiliary reflectors is such that the light generated by the filament is concentrated at the film gate aperture and the latter is more uniformly and brightly illuminated than heretofore, even in those cases where the film gate aperture is relatively narrow. The improved lamp, accordingly, operates in a more efficient manner so that the same light intensity can be obtained with lamps of lower wattage rating or, conversely, higher light intensities and brighter pictures can be obtained with lamps of the same wattage rating as with prior art lamps. In addition, the concentration of light is effected without exposing the film to excessive heating or employing specially shaped bulbs. The improved lamp is thus not as costly and is easier to make. Compared with the prior art lamps, the internal structure of the present lamp is simpler and sufficiently rugged to withstand the mechanical shocks and vibrations normally encountered during shipment and handling.

A better understanding of the invention will be obtained by referring to the accompanying drawing, wherein.

EMBODIMENT I

Figure 1:
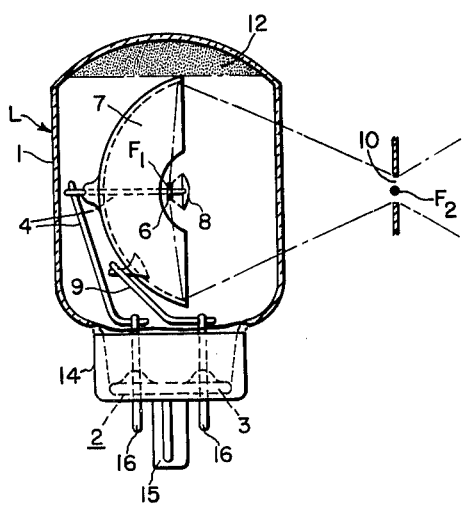
FIG. 1 is a side elevational view, partly in section, of an incandescent electric projection lamp incorporating the invention.
Figure 2:
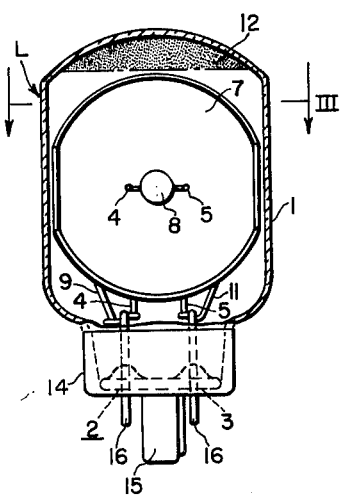
FIG. 2 is a front elevational view, partly in section, of the lamp shown in FIG. 1.

Referring now in detail to the drawing, in FIGS. 1 and 2 there is shown an incandescent electric projection lamp L comprising a glass enevelope 1 of cylindrical shape that is sealed at one end by a disk-shaped stem 2 and contains a compact filament 6 that is positioned between a relatively large main reflector 7 and a much smaller auxiliary reflector 8. Both the main reflector 7 and auxiliary reflector 8 are positioned so that their concave surfaces are disposed toward filament 6, as shown.

The main reflector 7 is held in the aforementioned position by lead-in conductor wires 4, 5 and a pair of support wires 9, 11. The stem 2 consists of a pressed glass flare 3 having a plurality of rigid pins 16 sealed therethrough. The inner ends of the pins are fastened, as by welding, to preselected ones of the aforementioned lead-in and support wires. The outer ends of the pins connected to the lead wires thus serve as the lamp contacts. The sealed end of the envelope 1 is enclosed by a suitable base cap 14 having an axially extending post 15 that is keyed to engage an apertured socket in the projector and thus properly orient the lamp L with respect to the film gate aperture 10 of the projector (see FIG. 1).

Figure 3:
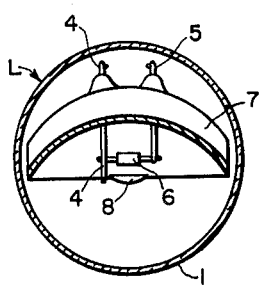
FIG. 3 is a cross-sectional view along the line III—III of FIG. 2.

As shown more particularly in FIG. 3, the compact filament 6 is held in place by the lead-in wires 4, 5 which pass through bosses provided at the rear of the main reflector 7 and then extend parallel to the reflector axis. The smaller auxiliary reflector 8 is attached to the end of the lead-in wire 4 which projects beyond the filament 6.

The filamentary light source 6 preferably consists of tungsten core wire that is overwound with a much finer tungsten wire to form a composite wire which is, in turn, wound around a flat mandrel. The mandrel is then removed to form a coil of predetermined dimensions that is rectangular in cross-section and also along its axial plane. The overwound coil disclosed in FIGS. 1 to 3 of U.S. Patent No. 2,218,345 is similar except that it is wound on the usual cylindrical mandrel and is thus not rectangular. As shown in FIGS. 1 and 3 of the present application, the filament 6 extends along a plane that is normal to the axis of the main reflector 7 and substantially aligned with the longitudinal axis of the lamp L. The dimensions of the rectangular body portion of the filament 6 are preferably such that the ratio of its sides is substantially equal to the ratio of the corresponding dimensions of the film gate aperture 10.

As shown in FIG. 1, the main reflector 7 comprises a portion of an ellipsoid having its first focal point $F_1$ inside the lamp L, substantially on the longitudinal axis thereof, and its second focal point $F_2$ outside the lamp at or proximate to the film gate aperture 10 of the projector. The main reflector 7 is symmetrical with respect to the major axis of the ellipsoid so that the axis of the ellipsoidal reflector coincides with the optical axis of the lamp L which, in turn, is normal to the longitudinal axis of the lamp. The filament 6 is located at the focal point $F_1$ located near the apex of the main reflector 7. In order to obtain a focal aperture as large as possible, the distance between the focal points is kept rather short by making the main reflector of suitable curvature. On the other hand, the distance between the film gate aperture 10 and the lamp envelope 1 must be large enough to accommodate a rotating screen or other portions of the projector system. The film gate aperture 10 is disposed in a plane that is normal to the optical axis of the lamp L defined by the axis of the main reflector 7 and is thus substantially parallel to the planar generally rectangular filament 6.

In this embodiment, the auxiliary reflector 8 consists of a spherically curved member the center of curvature whereof is located at or near the center of the planar filament 6, and preferably between the filament and the ellipsoidal main reflector 7. The diameter of the auxiliary reflector is substantially equal to the length of the diagonal of the rectangular planar filament 6, and in this particular embodiment is about 15 to 30 millimeters. The distance between the filament and the peripheral edge of the auxiliary reflector is about 1 to 5 millimeters, preferably 2.5 millimeters. The smaller auxiliary reflector 8 is symmetrical about and normal to the optical axis of the lamp and is disposed in such proximity to the filament 6 that it intercepts radiations that would otherwise pass directly from the filament into the film gate aperture 10. The auxiliary reflector may be made from refractory metal having good reflectance, particularly in the infrared region of the spectrum. Examples of suitable metals which meet these requirements are molybdenum, zirconium, titanium, tantalum, niobium, rhenium and their alloys. In this case, the auxiliary reflector 8 will reflect both visible and infrared radiations back onto the filament 6, as indicated by the convergent broken lines drawn between the filament and auxiliary reflector in FIG. 1.

In order to avoid the shading effect on the centrally located portion of the film aperture 10 produced by a metallic auxiliary reflector 8, it may be desirable to make this reflector from hard glass, quartz or other radiation-transmitting heat-resistant material having even higher melting points such as a suitable translucent ceramic—aluminum oxide, beryllium oxide, magnesium oxide, or mixtures of such oxides for example. In this case the auxiliary reflector 8 is coated with a thin vaporized layer of a material, such as gold, that transmits visible radiation and reflects infrared radiation. The same effect can also be obtained by utilizing several thin coatings of various materials that serve as interference layers and filter out the infrared in the well-known manner. If necessary, the selective reflective coating is covered by a translucent protective coating. With this construction the degree of shading of the centrally located portions of the main reflector 7 and the film gate aperture 10 is greatly reduced. In addition, infrared radiation is prevented from impinging directly on the aperture thereby avoiding an excessive build-up of heat at this point.

Regardless of the type of auxiliary reflector 8 which is used, the diameter of the reflector is such that it circumscribes the rectangular filamentary light source 6 so that the latter is completely shielded when the lamp L is viewed along its optical axis, as shown in FIG. 2.

In contrast to the optical characteristics of the auxiliary reflector 8, the main ellipsoidal reflector 7 can either be fabricated from a highly reflective metal (such as aluminum, silver or the like); or, preferably, from glass or other heat-resistant radiation-transmitting material and has its concave surface coated with well-known interference layers that transmit infrared radiation and reflect visible radiation. As a specific example of such a layer, the main reflector can be coated first with a film of a suitable semiconductive material such as germanium, silicon, antimony sulphide or selenium, and a second film of a preselected dielectric such as zinc sulphide. The reduction in the amount of infrared radiation reflected toward the film gate aperture 10 by this latter type of main reflector further reduces the heating effect on the film when the projector is in use.

If desired, the ellipsoidal main reflector 7 may also be pressed from glass or the like and have its inner concave surface coated with a highly reflective metal such as aluminum or silver which, in turn, may be coated with a protective layer.

EMBODIMENT II

Figure 4:
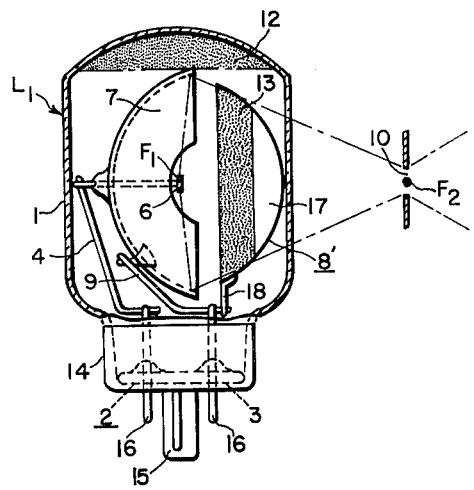
FIG. 4 is a side elevational view, partly in section, of an alternative lamp embodiment that utilizes a different type of auxiliary reflector.

In FIG. 4, there is shown another lamp embodiment $L_1$ that is identical to the lamp described above except that it is provided with a different type of auxiliary reflector 8' that is much larger than the compact filament 6. The auxiliary reflector in this case is supported in position by an additional pair of support wires 18 that are fastened to the same pins 16 as the support wires 9, 11 that hold the main ellipsoidal reflector 7 in place. In addition, the auxiliary reflector 8' is fabricated from heat-resistant radiation-transmitting material, as for example quartz, and only its peripheral edge portion is coated with a metallic reflective coating 13 thereby leaving a centrally located aperture or window 17 that is symmetrically arranged around the axis of the main reflector 7. Thus, light rays from the filament 6 and those reflected by the main reflector will pass through the window portion of the auxiliary reflector and impinge directly upon the film gate aperture 10. In addition, the light rays that would otherwise pass through the peripheral portion of the auxiliary reflector 8' and escape from the lamp are reflected by the coating 13 back toward the filament and the main reflector and, thus, are also directed through the window.

The transparent window 17 in the auxiliary reflector 8' may be provided, if desired, with a thin coating of metal or interference layers that transmit visible radiation and reflect infrared radiation thereby to avoid an excessive amount of heat at the film gate aperture 10. Alternatively, the auxiliary reflector may be made from reflective metal and the central portion removed to provide an aperture that serves as the light-transmitting window.

If desired, the bowl end of the envelope 1 may be provided with an inner reflecting coating 12 of silver or the like, as shown in FIGS. 1, 2 and 4. Preferably, this coating consists of zirconium, zirconium-cesium alloy or graphite so that it also acts as a getter. The outer surface of this portion of the bulb can also be provided with a coating of aluminum-bronze or the like.

It will be appreciated from the foregoing that the objects of the invention have been achieved insofar as a projection lamp with an integral reflector means has been provided which lamp is not only very efficient but is stronger, easier to make and less expensive than the prior art lamps of this type.

While several embodiments of the invention have been illustrated and described in detail, it will be appreciated that various changes in both the configuration and arrangement of parts can be made without departing from the spirit and scope of the invention.

I claim as my invention:

1. An incandescent electric projection lamp comprising, a sealed envelope of generally tubular configuration, an ellipsoidal main reflector supported within said envelope with its axis disposed substantially normal to the longitudinal axis of said envelope and coincident with the optical axis of the lamp, said main reflector comprising a portion of an ellipsoid that is substantially symmetrical with respect to the major axis of the ellipsoid and is positioned so that its first focal point lies within the envelope and its second focal point lies outside the envelope, a concentrated filament located at the first focal point of said ellipsoidal main reflector, and an auxiliary reflector of spherical configuration supported in close proximity to said filament on the side thereof remote from said main reflector, said auxiliary reflector being symmetrical with respect to the optical axis of the lamp and having its concave surface disposed toward said filament and adapted thereby to intercept direct radiations from said filament and reflect them back onto the filament.

2. An incandescent electric projection lamp as set forth in claim 1 wherein; said ellipsoidal main reflector is fabricated from radiation-transmitting material and is provided with a coating that reflects visible radiation and transmits infrared radiation; and said auxiliary reflector is opaque and of such diameter that it circumscribes the filament and thus intercepts all of the direct radiations from said filament that would otherwise pass out of the lamp along its optical axis when the filament is energized.

3. An incandescent electric projection lamp as set forth in claim 1 wherein; said auxiliary reflector is fabricated from radiation-transmitting material, and a centrally located portion of said auxiliary reflector carries a coating that transmits visible radiation and reflects infrared radiation.

4. An incandescent electric projection lamp as set forth in claim 1 wherein said auxiliary reflector is fabricated from a refractory metal selected from the group consisting of molybdenum, zirconium, titanium, tantalum, niobium, rhenium, and alloys thereof.

5. An incandescent electric projection lamp adapted for use in a projection system that includes a lamp socket and a narrow film gate aperture that is located a predetermined distance from said socket, said lamp comprising, a generally cylindrical envelope, a compact filamentary light source sealed within said envelope, lead-in wires sealed through said envelope and supporting the filamentary light source in predetermined position within said envelope, a main reflector within said envelope that reflects visible radiation and transmits infrared radiation, said main reflector comprising a portion of an ellipsoid that is substantially symmetrical with respect to the major axis of the ellipsoid and has its concave surface disposed toward said filamentary light source, said ellipsoidal main reflector being so oriented within said envelope that its axis is substantially normal to the envelope axis and its first focal point lies on the light source and its second focal point lies outside of said envelope and on the optical axis of the lamp at a distance from said lamp that is substantially equal the the distance between said film gate aperture and lamp socket, a plurality of wires anchored in a stem at one end of said envelope and supporting said ellipsoidal main reflector in the aforesaid position, and an auxiliary reflector of spherical configuration supported in close proximity to said filamentary light source on the side thereof remote from said main reflector, said auxiliary reflector having its concave surface disposed toward said light source and being of such diameter and curvature that it intercepts radiation that would otherwise pass directly from the light source into the film gate aperture of the projector system and reflects at least part of the intercepted radiation back onto said light source.

6. An incandescent electric projection lamp as set forth in claim 5 wherein; said filamentary light source comprises a tungsten wire coil of rectangular configuration that is disposed in a plane substantially normal to the axis of the main reflector, and the diameter of the spherical auxiliary reflector is substantially equal to the length of the diagonal of said rectangularly-shaped filament coil.

7. An incandescent electric projection lamp as set forth in claim 5 wherein; said filamentary light source comprises a tungsten core wire that is wound into a coil which is rectangular in cross-section and along its axial plane and is disposed in a plane substantially normal to the axis of the ellipsoidal main reflector; said core wire is provided with an overwinding of fine tungsten wire; and the ratio of the side dimensions of said rectangular coiled filament is substantially equal to the ratio of the corresponding dimensions of the film gate aperture of the projector system.

8. An incandescent electric projection lamp as set forth in claim 5 wherein; said auxiliary reflector is fabricated from light-transmitting heat-resistant material selected from the group consisting of hard glass, quartz, aluminum oxide, beryllium oxide, magnesium oxide, and mixtures of said oxides; and said auxiliary reflector carries a coating that transmits visible radiation and reflects infrared radiation.

9. An incandescent electric projection lamp as set forth in claim 5 wherein; said spherical auxiliary reflector is fabricated from light-transmitting material and is larger than said filamentary light source, the peripheral portion of said auxiliary reflector is coated with a material that reflects visible radiation, and the centrally located portion of said auxiliary reflector is clear of such coating and constitutes a window that is symmetrical with respect to the axis of the main reflector.

10. An incandescent electric projection lamp as set forth in claim 9 wherein the centrally located window portion of the auxiliary reflector carries a coating that transmits visible radiation and reflects infrared radiation.

11. An incandescent electric projection lamp comprising, a sealed vitreous envelope of generally tubular configuration, an ellipsodial main reflector supported within said envelope with its axis disposed substantially normal to the longitudinal axis of said envelope and coincident with the optical axis of the lamp, said main reflector being of such dimensions and curvature that its first focal point lies within the envelope and its second focal point lies outside the envelope, said main reflector being fabricated from radiation-transmitting material and having a coating thereon that reflects visible radiation and transmits infrared radiation, and an auxiliary reflector of spherical configuration supported adjacent said filament on the side thereof opposite said main reflector, said auxiliary reflector having its concave surface disposed toward said filament and being so oriented that its center of curvature lies proximate the filament and on the optical axis of the lamp, at least the central portion of said auxiliary reflector being fabricated from radiation-transmitting material and having a coating thereon that reflects infrared radiation and transmits visible radiation.

12. An incandescent electric projection lamp as set forth in claim 11 wherein the center of curvature of said spherical auxiliary reflector lies between said filament and ellipsoidal main reflector.

13. An incandescent electric projection lamp comprising, a sealed vitreous envelope of generally tubular configuration, an ellipsoidal main reflector supported within said envelope with its axis disposed substantially normal to the longitudinal axis of said envelope and coincident with the optical axis of the lamp, said main reflecator being so positioned that its first focal point lies within the envelope and its second focal point lies outside the envelope on the optical axis of said lamp, a light source located at the first focal point of said ellipsoidal main reflector and comprising a refractory wire coil of rectangular cross-section that is disposed in a plane substantially normal to the axis of said main reflector, and an auxiliary reflector of concave configuration supported adjacent said filament on the side thereof opposite said main reflector, said auxiliary reflector having its concave surface disposed toward said filament and being of such dimension that it circumscribes the filament when the lamp is viewed along its optical axis.

References Cited by the Examiner
UNITED STATES PATENTS

| | | | |
|---|---|---|---|
| 1,863,547 | 6/1932 | Arbuckle | 313—114 X |
| 2,592,102 | 4/1952 | Alexander | 313—111 X |
| 2,798,943 | 6/1957 | Prideaux | 240—47 |
| 3,082,345 | 3/1963 | Bottone | 313—113 |
| 3,160,776 | 12/1964 | Cardwell et al. | 313—112 |
| 3,162,785 | 12/1964 | Scoledge et al. | 313—112 |

NORTON ANSHER, *Primary Examiner.*

V. A. SMITH, *Assistant Examiner.*